(12) United States Patent
Olgaard et al.

(10) Patent No.: US 7,948,254 B2
(45) Date of Patent: May 24, 2011

(54) DIGITAL COMMUNICATIONS TEST SYSTEM FOR MULTIPLE INPUT, MULTIPLE OUTPUT (MIMO) SYSTEMS

(75) Inventors: Christian Volf Olgaard, Saratoga, CA (US); Ray Wang, San Ramon, CA (US)

(73) Assignee: LitePoint Corporation, Sunnyvale, CA (US)

( * ) Notice: Subject to any disclaimer, the term of this patent is extended or adjusted under 35 U.S.C. 154(b) by 188 days.

(21) Appl. No.: 12/348,992

(22) Filed: Jan. 6, 2009

(65) Prior Publication Data
US 2010/0123471 A1 May 20, 2010

Related U.S. Application Data

(60) Provisional application No. 61/116,510, filed on Nov. 20, 2008.

(51) Int. Cl.
*G01R 31/00* (2006.01)
(52) U.S. Cl. .................. 324/756.05; 375/260
(58) Field of Classification Search .............. None
See application file for complete search history.

(56) References Cited

U.S. PATENT DOCUMENTS

| | | | | |
|---|---|---|---|---|
| 6,452,411 B1 * | 9/2002 | Miller et al. | ............. | 324/754.07 |
| 6,922,529 B2 * | 7/2005 | Bortz et al. | ............. | 398/5 |
| 7,239,772 B2 * | 7/2007 | Wang et al. | ............. | 385/17 |
| 7,349,670 B2 | 3/2008 | Mlinarsky et al. | | |
| 2008/0151763 A1 | 6/2008 | Lee et al. | | |

FOREIGN PATENT DOCUMENTS

KR 10-2003-0037881 A 5/2003

OTHER PUBLICATIONS

Walvis, D. et al., "MIMO WLAN Test Methodologies for Manufacturing," RF Design, Jun. 2007, pp. 26-30.
International Search Report corresponding to International Patent Application No. PCT/US2009/049066, Korean Int. Property Office, Jan. 4, 2010, 2 pgs.
Written Opinion corresponding to International Patent Application No. PCT/US2009/049066, Korean Int. Property Office, Jan. 4, 2010, 4 pgs.

* cited by examiner

*Primary Examiner* — Ha Tran T Nguyen
*Assistant Examiner* — Richard Isla Rodas
(74) *Attorney, Agent, or Firm* — Vedder Price, P.C.

(57) ABSTRACT

A digital communications test system and method for testing a plurality of devices under test (DUTs) in which multiple sets of a single vector signal analyzer (VSA) and single vector signal generator (VSG) can be used together to perform error vector magnitude (EVM) measurements for one or more DUTs in parallel, including one or more of composite, switched and multiple input multiple output (MIMO) EVM measurements. This allows N pairs of a VSA and VSG to test N DUTs with N×N MIMO in substantially the sane time as a single VSA and VSG pair can test a single DUT, thereby allowing a substantial increase in testing throughput as compared to that possible with only a single VSA and VSG set.

8 Claims, 9 Drawing Sheets

DIGITAL COMMUNICATIONS TEST SYSTEM FOR MULTIPLE INPUT, MULTIPLE OUTPUT (MIMO) SYSTEMS

CROSS-REFERENCE TO RELATED APPLICATION

The present patent application claims priority from and the benefit of U.S. Provisional Patent Application No. 61/116,510, filed Nov. 20, 2008, and entitled Digital Communications Test System for Multiple Input, Multiple Output (MIMO) Systems, which prior application is hereby incorporated herein by reference.

BACKGROUND

1. Field of the Invention

The present invention relates to digital communications test systems, and in particular, to test systems for testing multiple input, multiple output ("MIMO") systems.

2. Related Art

Testing of MIMO systems with multiple channels using conventional test equipment presents a number of challenges. Generally, multiple test instruments are required and must be synchronized in frequency and time to produce and analyze the MIMO signals of a device under test (DUT). One example of such a system is the "IQn×n" test system designed, manufactured and sold by LitePoint Corporation of Sunnyvale, Calif. Such a system uses multiple vector signal analyzers (VSAs) and vector signal generators (VSGs). However, one disadvantage of such a system is the additional cost of multiple VSAs and VSGs, which often makes use of such systems cost prohibitive for manufacturing in which multiple such systems are required. Accordingly, to minimize costs during manufacturing tests, solutions have been developed allowing the test of a MIMO DUT using a single VSA and single VSG. Such solutions focus on testing the DUT transmitter using a single VSA. Examples include composite error vector magnitude (EVM) analysis or switched EVM analysis. One example of a composite EVM test system and method can be found in U.S. patent application Ser. No. 11/533,971, filed Sep. 21, 2006, and entitled "Apparatus and Method for Simultaneous Testing of Multiple Orthogonal Frequency Division Multiplexed Transmitters With Single Vector Signal Analyzer" (the disclosure of which is incorporated herein by reference).

Alternatively, switched EVM testing can be performed in which the output of each transmitter can be captured individually by switching the input to the VSA between the different DUT transmitters. The resulting captured data are combined and analyzed as if the captured data was from the same packet.

Such testing techniques do allow testing of the MIMO functionality of the DUT, although perhaps not fully according to the specification established by the Institute of Electrical and Electronics Engineers (IEEE). However, such testing does operate the DUT in a challenging mode of operation by transmitting multiple streams of data through the different DUT transmitters. Both testing techniques can encounter limitations for testing MIMO systems, i.e., switched EVM testing can be problematic when testing DUT transmitters employing spatial diversity expansion. Similarly, composite EVM testing can be problematic for measuring single data stream operation transmitted via multiple transmitters, as well as transmitter isolation. Further, both testing techniques require known data in the transmitted data packets.

What is also lacking is an effective testing technique for testing the multiple receivers in a MIMO DUT using MIMO signal waveforms. This limitation exists due to the use of a single VSG which allows only one data stream to be generated, so the same data stream will be presented to all of the DUT receivers. One option is to test MIMO operation by verifying the maximum ratio combining (MRC) capability of a DUT using a single data stream by comparing the difference between the sensitivity when the signal is received by a single receiver and the sensitivity when the same signal is received by all DUT receivers. (As is well known in the art, MRC testing combines the signals from multiple spatial diversity branches, with each branch signal multiplied by a weight factor that is proportional to the signal magnitude i.e., stronger signals are further amplified while weaker signals are attenuated.) This tests the capability of the DUT to process parallel receive data streams and, from that, improve the sensitivity of the DUT (the theoretical improvement is $10*\log 10 N$, where N is the number of DUT receivers). However, to perform a real MRC test, it is generally necessary to compare sensitivity points between the various receiver inputs to verify true MIMO performance.

Determining this sensitivity point is generally a long process, requiring more time than a simple packet error rate (PER) test, although some improved testing techniques have been developed such as U.S. patent application Ser. No. 10/908,946, filed Jun. 1, 2005, and entitled "Method for Measuring Sensitivity of Data Packet Signal Receiver" (the disclosure of which is incorporated herein by reference), and U.S. patent application Ser. No. 11/161,692, filed Aug. 12, 2005, and entitled "Method for Measuring Multiple Parameters of a Signal Transmitted By a Signal Generator" (the disclosure of which is incorporated herein by reference). Further, it is possible that a MRC test using a single data stream may not test the true MIMO capability of the DUT, since it cannot exercise the true MIMO multi-stream processing of the DUT, and thus not verify performance at the highest data rates. Such a MRC test generally ensures only that the MRC signal processing is functional and that there is no coupling between the different DUT receiver signal paths that might prevent MIMO operation with multiple data streams. Accordingly, it is generally assumed that the signal processing inside the DUT will work (as it was supposed to have been tested by the chip manufacturer).

One alternative technique often used is including "a golden unit" i.e., a manufactured unit that has been fully, and often manually, tested as part of the test system to ensure operation at the maximum data rate. However, this is not ideal as a manufacturing solution, since accuracy, reliability and repeatability can vary, often significantly.

Until recently, these limitations on production testing have been more or less acceptable since the data rates needed in typical uses has been much lower than the data rates of which MIMO systems are capable. For example, when a typical user is accessing the Internet, data rates are typically limited to 10 megabits per second (mbps) or less from the Internet service provider (ISP). Accordingly, a MIMO system capable of more than 100 mbps will not be fully exercised. Hence, if the system is not fully operational, e.g., the system is not capable of receiving multiple streams of data at its maximum data rate, the user will not likely notice as the available data rates of 10 mbps can easily be served via a single data stream.

However, new devices and applications are using the higher bandwidths provided by MIMO. For example, video streaming can produce peak data rates greater than 100 mbps, as can some newer wireless data storage systems which require the highest possible data rate so as to perform a system data backup in the shortest time possible.

SUMMARY OF THE INVENTION

In accordance with the presently claimed invention, a digital communications test system and method are provided for testing a plurality of devices under test (DUTs) in which multiple sets of a single vector signal analyzer (VSA) and single vector signal generator (VSG) can be used together to perform error vector magnitude (EVM) measurements for one or more DUTs in parallel, including one or more of composite, switched and multiple input multiple output (MIMO) EVM measurements. This allows N pairs of a VSA and VSG to test N DUTs with N×N MIMO in substantially the sane time as a single VSA and VSG pair can test a single DUT, thereby allowing a substantial increase in testing throughput as compared to that possible with only a single VSA and VSG set.

In accordance with one embodiment of the presently claimed invention, a digital communications test system for testing a plurality of devices under test (DUTs), including:

a plurality of DUT electrodes to couple to a plurality of DUTs, convey a plurality of DUT transmission signals from the plurality of DUTs, and convey a plurality of DUT reception signals to the plurality of DUTs;

a plurality of signal combining and dividing circuits to couple to a plurality of vector signal analyzers (VSAs) and a plurality of vector signal generators (VSGs), wherein each one of the plurality of signal combining and dividing circuits is adapted to combine at least first and second ones of the plurality of DUT transmission signals for a respective one of the plurality of VSAs, and divide a signal from a respective one of the plurality of VSGs to provide at least first and second ones of the plurality of DUT reception signals; and a plurality of signal conveyance control circuits coupled between the plurality of DUT electrodes and the plurality of signal combining and dividing circuits, and responsive to one or more conveyance control signals by conveying one or more selected ones of the plurality of DUT transmission signals from one or more of the plurality of DUT electrodes to one or more of the plurality of signal combining and dividing circuits, and conveying one or more of the plurality of DUT reception signals from one or more of the plurality of signal combining and dividing circuits to one or more of the plurality of DUT electrodes.

In accordance with another embodiment of the presently claimed invention, a digital communications test system for testing a plurality of devices under test (DUTs), including:

a plurality of DUT connector means for conveying a plurality of DUT transmission signals from a plurality of DUTs, and conveying a plurality of DUT reception signals to the plurality of DUTs;

a plurality of signal combiner and divider means each one of which is for combining at least first and second ones of the plurality of DUT transmission signals for a respective one of a plurality of vector signal analyzers (VSAs) and dividing a signal from a respective one of a plurality of vector signal generators (VSGs) to provide at least first and second ones of the plurality of DUT reception signals; and a plurality of signal conveyance control means for responding to one or more conveyance control signals by conveying one or more selected ones of the plurality of DUT transmission signals from one or more of the plurality of DUT electrodes to one or more of the plurality of signal combining and dividing circuits, and conveying one or more of the plurality of DUT reception signals from one or more of the plurality of signal combining and dividing circuits to one or more of the plurality of DUT electrodes.

In accordance with another embodiment of the presently claimed invention, a method for facilitating testing of a plurality of devices under test (DUTs) having multiple input multiple output (MIMO) radio frequency (RF) signal transmission and reception capabilities with a plurality of separate vector signal analyzers (VSAs) and a plurality of vector signal generators (VSGs) includes:

providing a plurality of controllable signal paths for controlling conveyance of a plurality of RF signals between a plurality of DUTs, a plurality of VSAs and a plurality of VSGs; and receiving a plurality of control signals and in response thereto controlling respective ones of the plurality of controllable signal paths such that each one of a first portion of the plurality of controllable signal paths has a lower impedance to facilitate conveyance of one or more of the plurality of RF signals, and each one of a second portion of the plurality of controllable signal paths has a higher impedance to substantially prevent conveyance of another one or more of the plurality of RF signals, wherein, in accordance with the plurality of control signals, the plurality of controllable signal paths facilitate one or more of substantially simultaneous conveyance of first multiple ones of the plurality of RF signals from one of the plurality of DUTs to one of the plurality of VSAs, alternating conveyance of second multiple ones of the plurality of RF signals from another one of the plurality of DUTs to another one of the plurality of VSAs, substantially simultaneous conveyance of at least first and second ones of the plurality of RF signals from at least first and second ones of the plurality of VSGs, respectively, to each of at least first and second ones of the plurality of DUTs, alternating conveyance of the at least first and second ones of the plurality of RF signals from the at least first and second ones of the plurality of VSGs, respectively, to the each of at least first and second ones of the plurality of DUTs, and substantially simultaneous conveyance of at least first and second ones of the plurality of RF signals from one of the plurality of DUTs to at least first and second ones of the plurality of VSAs.

In accordance with another embodiment of the presently claimed invention, a method of testing a plurality of devices under test (DUTs) having multiple input multiple output (MIMO) radio frequency (RF) signal transmission and reception capabilities with a plurality of vector signal analyzers (VSAs) and a plurality of vector signal generators (VSGs) includes:

providing a plurality of controllable signal paths for controlling conveyance of a plurality of RF signals between a plurality of DUTs, a plurality of VSAs and a plurality of VSGs;

preparing the plurality of DUTs for RF signal testing;

receiving, via the plurality of controllable signal paths, one or more of a first plurality of RF signals substantially simultaneously from one of the plurality of DUTs with one of a plurality of VSAs, and alternating ones of a second plurality of RF signals from another one of the plurality of DUTs with another one of the plurality of VSAs;

receiving, via the plurality of controllable signal paths, one or more of
  at least first and second ones of a plurality of RF signals at least partially simultaneously from at least first and second ones of a plurality of VSGs, respectively, with each of at least first and second ones of the plurality of DUTs, and
  the at least first and second ones of a plurality of RF signals from the at least first and second ones of a plurality of VSGs, respectively, with alternating ones of the at least first and second ones of the plurality of DUTs.

In accordance with another embodiment of the presently claimed invention, a method of testing a plurality of devices under test (DUTs) having multiple input multiple output (MIMO) radio frequency (RF) signal transmission and reception capabilities with a plurality of vector signal analyzers (VSAs) and a plurality of vector signal generators (VSGs) includes:
  providing a plurality of controllable signal paths for controlling conveyance of a plurality of RF signals between a plurality of DUTs, a plurality of VSAs and a plurality of VSGs;
  preparing the plurality of DUTs for RF signal testing;
  receiving with the plurality of VSAs, via alternating portions of the plurality of controllable signal paths, one or more of
    at least first and second ones of the plurality of RF signals substantially simultaneously from one of the plurality of DUTs, and
    at least third and fourth ones of the plurality of RF signals substantially simultaneously from another one of the plurality of DUTs; and
  receiving, via the plurality of controllable signal paths, one or more of
    at least partially simultaneously at least fifth and sixth ones of the plurality of RF signals at least partially simultaneously from the plurality of VSGs with the plurality of DUTs, and
    the at least fifth and sixth ones of the plurality of RF signals from the plurality of VSGs with alternating ones of the plurality of DUTs.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

Figure 1:
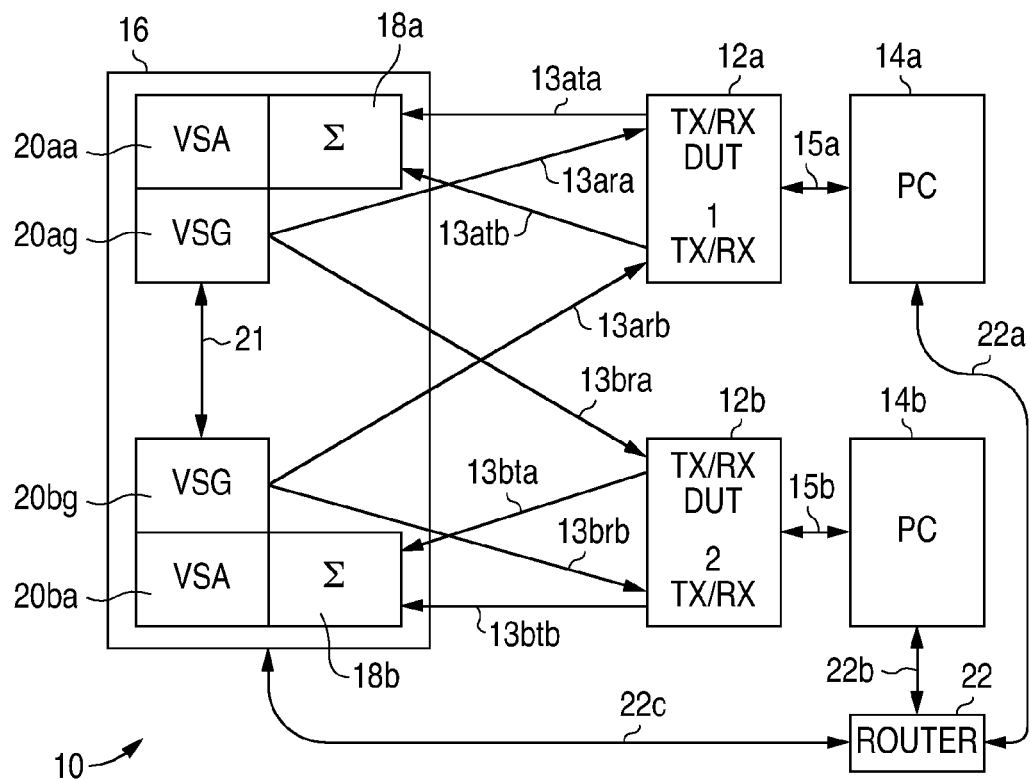
FIG. 1 is a functional block diagram of conceptual operation of a 2×2 test system using a test interface in accordance with one embodiment of the presently claimed invention.

Referring to FIG. 1, a test system 10 for conceptually illustrating operation of a test in accordance with one embodiment of the presently claimed invention provides for testing of two DUTs 12a, 12b, each of which is controlled by a respective computer 14a, 14b via one or more respective control signals 15a, 15b. The DUTs 12a, 12b are coupled to a test system 16, which includes two VSAs 20aa, 20ba, two signal combining circuits 18a, 18b and two VSGs 20ag, 20bg. The combining circuits 18a, 18b are preferably combining circuits capable of passing either input to the output or combining and passing both inputs to the output (e.g., for composite EVM testing), such as well known bi-directional signal power combiners (which would be shared by their associated VSA and VGA). Alternatively, the combining circuits 18a, 18b can be signal switches capable of passing a selected input to the output (e.g., for switched EVM testing). Such a system 16 enables testing of MIMO transmitters using a single VSA. The VSA/VSG combinations 20aa/20ag, 20ba/20bg are preferably mutually synchronized in time and frequency via a synchronizing interface 21 (e.g., shared triggered local oscillator sources). The computers 14a, 14b communicate with each other and the test system 16 via signal interfaces 22a, 22b, 22c and a router 22. Alternatively, one single computer can be used to control both DUTs 12a, 12b.

As discussed in more detail below, the first DUT 12a can provide both of its transmit signals 13ata, 13atb to the first signal combiner 18a, as can the second DUT 12b provide its transmit signals 13bta, 13btb to the second signal combiner 18b. This will enable parallel testing of the transmitters of both DUTs 12a, 12b using known methods for testing MIMO transmitters with a single VSA. Additionally, the first VSG 20ag can provide DUT reception signals 13ara, 13bra for one receiver of each DUT 12a, 12b, as can the second VSG 20bg provide DUT reception signals 13arb, 13brb for the other DUT receivers. As noted above, the signal connections as shown are conceptual only. In accordance with the presently claimed invention, however, these signal connections can be implemented in a number of ways as will be described below in more detail.

Figure 2A:
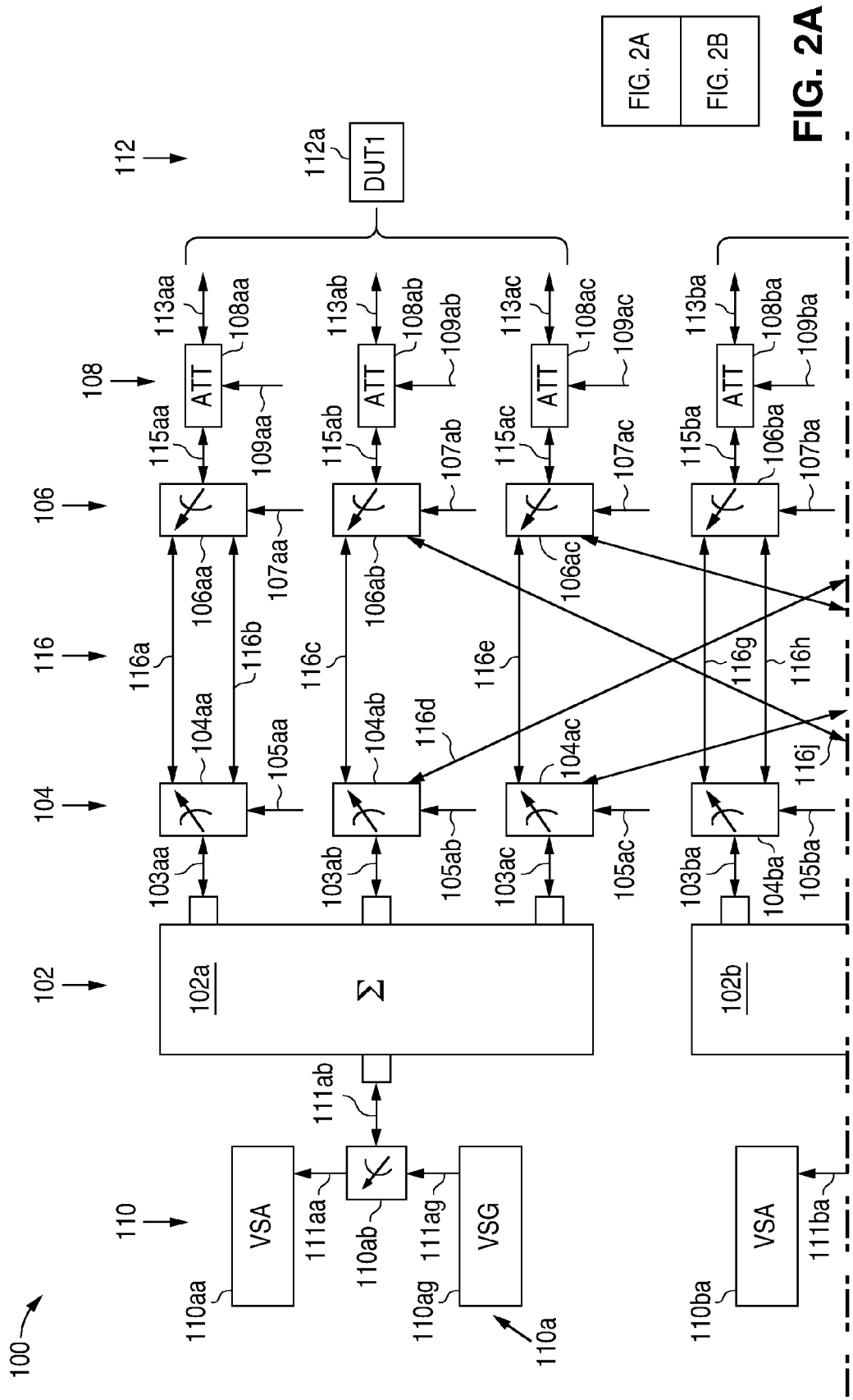
FIG. 2 is a functional block diagram of a test interface for a 3×3 test system in accordance with one embodiment of the presently claimed invention.
Figure 2B:
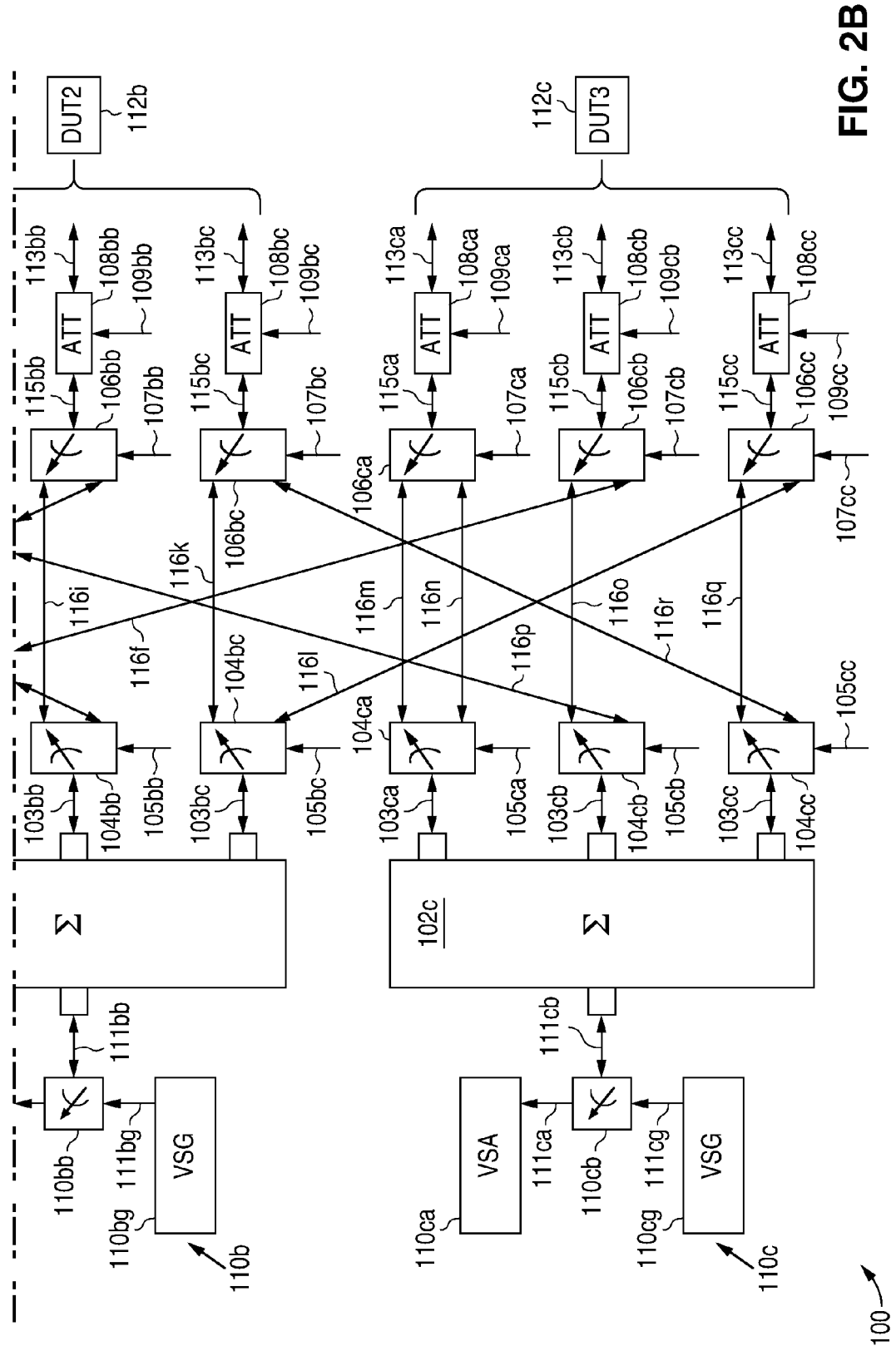

Referring to FIG. 2, a test interface 100 for providing a 3×3 interface between 3 DUTs 112a, 112b, 112c and three parallel VSA/VSG assemblies 110a, 110b, 110c can be implemented using 3 signal combiners 102a, 102b, 102c and 18 single pole, double throw signal switches 104aa, 104ab, 104ac, 104ba, 104bb, 104bc, 104ca, 104cb, 104cc, 106aa, 106ab, 106ac, 106ba, 106bb, 106bc, 106ca, 106cb, 106cc, interconnected substantially as shown. Additionally, nine signal attenuators 108aa, 108ab, 108ac, 108ba, 108bb, 108bc, 108ca, 108cb, 108cc can be used to scale or control e.g., balance, the magnitudes of the signals 113aa, 113ab, 113ac, 113ba, 113bb, 113bc, 113ca, 113cb, 113cc, transmitted by or to be received by the DUTs 112a, 112b, 112c. Additionally, these attenuators 108 can be programmable via one or more attenuation control signals 109aa, 109ab, 109ac, 109ba, 109bb, 109bc, 109ca, 109cb, 109cc.

In accordance with well known principles, the signal combiners 102 are bi-directional and by splitting (in magnitude) a signal provided at its single signal port into substantially equal signals at its multiple signal ports, while combining (in magnitude) signals at its multiple signal ports into a composite signal at its single signal port. For example, the first signal combiner 102a splits an input signal 111ab into 3 substantially equal (in magnitude) output signals 103aa, 103ab, 103ac. Conversely, the signal combiner 102a also combines multiple input signals 103aa, 103ab, 103ac into a composite output signal 111ab.

Further, in accordance with well known principles, the signal switches 104, 106, in accordance with their respective switch control signals 105aa, 105ab, 105ac, 105ba, 105bb, 105bc, 105ca, 105cb, 105cc, 107aa, 107ab, 107ac, 107ba, 107bb, 107bc, 107ca, 107cb, 107cc, alternately provide closed signal connections between the respective signal ports of the signal combiners 102 and DUTs 112. For example, the first set of switches 104aa, 106aa can provide one of two closed signal paths 116a, 116b. Similarly, the second set of signal switches 104ab, 106ab in conjunction with another set of signal switches 104bb, 106bb can alternately provide four closed signal paths 116c, 116d, 116i, 116j between various ports of the first and second signal combiners 102a, 102b and first and second DUTs 112a, 112b.

The signal switches 104, 106 are coupled between the individual ports of the signal combiners 102 and DUTs 112 so as to provide multiple combinations of open and closed signal paths 116 such that each individual radio frequency (RF) signal port of each DUT 112 can communicate directly with a single VSA 110aa, 110bc, 110ca. For example, each individual signal 113aa, 113ab, 113ac, in accordance with appropriate settings of their associated signal switches, 104aa, 106aa, 104ab, 106ab, 104ac, 106ac, communicate via closed signal paths 116a, 116c, 116e and combine in the signal combiner 102a to produce a composite signal 111ab, which is directed, via a signal router (e.g. switch) 110ab, as the input signal 111aa to the same VSA 110aa. This enables composite EVM testing. Alternatively, by switching two of the associated switches to their other positions, thereby opening the signal paths such that only one transmitter is connected to the power combiner, switched EVM testing can be performed by closing one signal path at a time. Similarly, composite and switched EVM testing can be performed for the second DUT 112b with its VSA 110ba through appropriate settings of its associated signal switches 104ba, 106ba, 104bb, 106bb, 104bc, 106bc, as well as for the third DUT 112c with its VSA 110ca through appropriate settings of its associated signal switches 104ca, 106ca, 104cb, 106cb, 104cc, 106cc.

Additionally, appropriate settings of the signal switches 104, 106 (as well as the test system switches 110a, 110bb, 110cb) ensure that each VSG 110ag, 110bg, 110cg can communicate a signal to at least one of the RF signal ports of each DUT 112a, 112b, 112c. For example, the first VSG 110ag can communicate its signal 111ag to the first DUT 112a via associated signal switches 104aa, 106aa, to the second DUT 112b via associated signal switches 104ab, 106bb, and the third DUT 112c via associated signal switches 104ac, 106cb. Similar connections can be provided between the remaining VSGs 110bg, 110cg and the DUTs 112a, 112b, 112c as well.

As will be readily appreciated by one of ordinary skill in the art, the pairing of the signal switches 104aa, 106aa, 104ba, 106ba, 104ca, 106ca having both throws mutually connected are implemented as single pole, double throw switches for consistency with the remaining switches, 104, 106, but can be replaced by single pole, single throw switches, or alternatively as programmable signal attenuators for which "opening" and "closing" the signal path equates to programming higher and lower signal attenuations, respectively. Additionally, it would be further readily recognized that additional embodiments can be implemented beyond the 3×3 implementation illustrated here using additional combinations of signal switches and signal combiners with a corresponding number of signal combining ports, as well as in 2×2 implementations (as discussed in more detail below).

Figure 3:
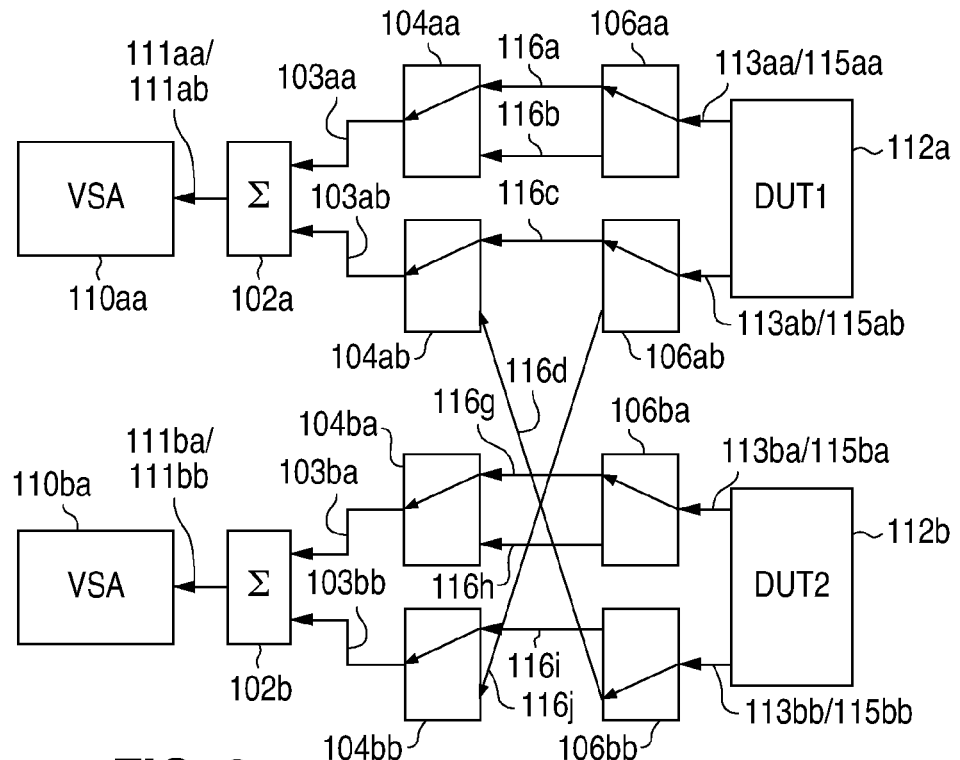
FIG. 3 is a functional block diagram of a 2×2 test interface for testing in accordance with another embodiment of the presently claimed invention.

Referring to FIG. 3, in accordance with another embodiment of the presently claimed invention, a 2×2 test interface can be configured to perform MIMO transmission testing using known single VSA measurement techniques. As shown, the two individual VSAs 110aa, 110ba operate independently of each other while testing the DUTs 112a, 112b. The first VSA 110aa is performing composite EVM testing with both transmission signals 113aa/115aa, 113ab/115ab of the first DUT 112a being provided via closed signal paths 116a, 116c and combined by the signal combiner 102a. The second VSA 110ba is performing switched EVM testing with the first transmission signal 113ba/115ba from the second DUT 112b being provided via a closed signal path 116g to the signal combiner 102b, following which the associated signal switches 106ba, 106bb are programmed to switch their connections, thereby opening the first signal path 116g and closing the second signal path 116i for testing the second transmission signal 113bb/115bb. (Such signal designators, e.g., 113aa/115aa, indicate that the subject signal can be either the DUT signal 113aa or the attenuated signal 115aa depending upon whether the attenuators 108 are used.)

Figure 4:
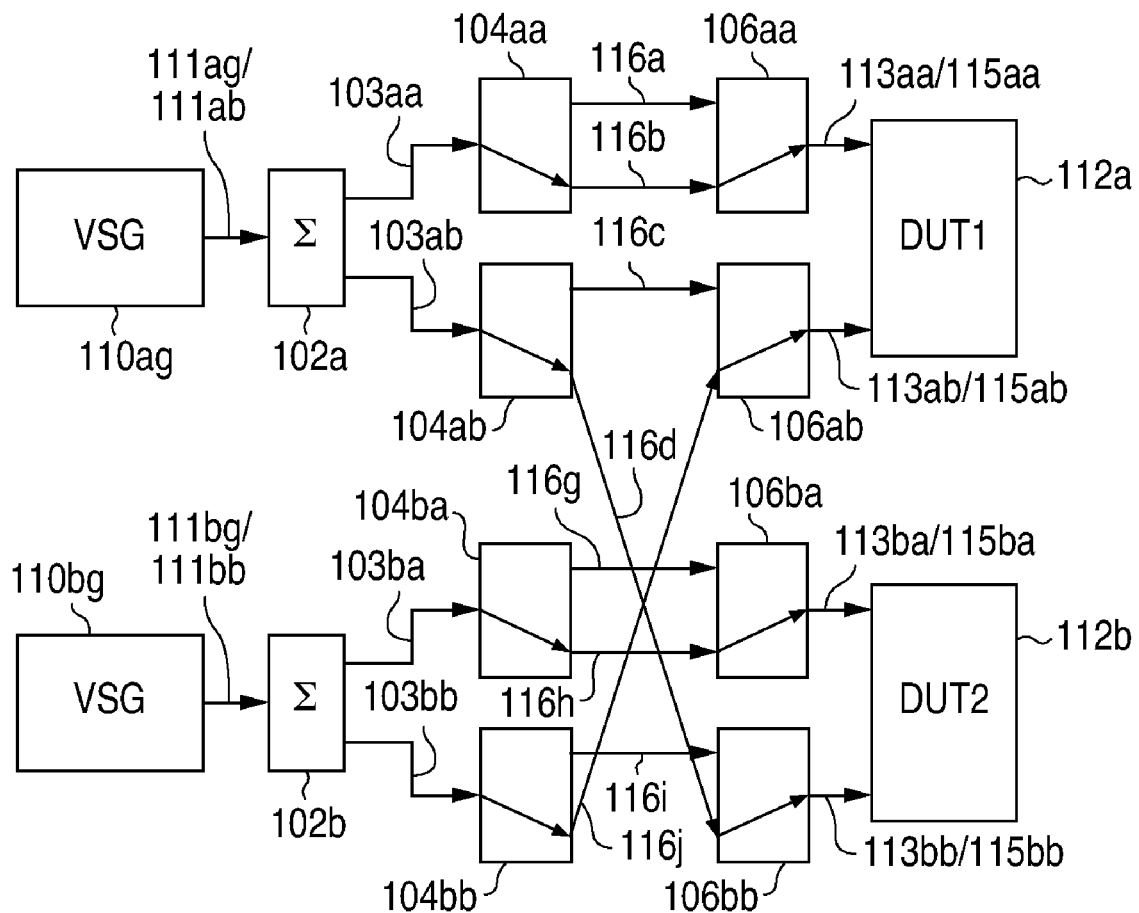
FIG. 4 is a functional block diagram of the 2×2 interface of FIG. 4 for testing in accordance with another embodiment of the presently claimed invention.

Referring to FIG. 4, in accordance with another embodiment of the presently claimed invention, the switches, 104, 106, 110ab, 110bb (FIG. 2) can be programmed for testing the receive operation of the DUTs 112a, 112b. As will be readily appreciated for receiver testing, one VSG signal can be provided to multiple DUTs, since limited interaction between the VSG and DUT is generally needed. For example, one or more data packets are sent to a DUT, in response to which the DUT will transmit back an acknowledgment signal (ACK). Hence, a simple detection of an acknowledgement signal before the power combiners 102 can be performed to record individual counts of acknowledgment data packets. Some examples of this type of testing can be found in U.S. patent application Ser. No. 11/279,778, filed Apr. 14, 2006, and entitled "Method for Testing Embedded Wireless Transceiver With Minimal Interaction Between Wireless Transceiver and Host Processor During Testing" (the disclosure of which is incorporated herein by reference), and U.S. patent application Ser. No. 11/839,814, filed Aug. 16, 2007, and entitled "System for Testing an Embedded Wireless Transceiver" (the disclosure of which is incorporated herein by reference). The computer (not shown) controlling such DUT can also inquire as to how many data packets have been received and, knowing how many data packets were to have been sent, compute the PER.

For example, the signal 111*ag*/111*ab* from the first VSG 110*ag* is provided to one receiver of each DUT 112*a*, 112*b* via its signal combiner 102*a*, signal paths 116*a*, 116*d* and associated signal switches 104*aa*, 106*aa*, 104*ab*, 106*bb*. Similarly, the signal 111*bg*/111*bb* provided by the second VSG 110*bg* can be provided to the other receiver ports of the DUTs 112*a*, 112*b* via its signal combiner 102*b*, signal paths 116*h*, 116*j* and associated signal switches 104*ba*, 106*ba*, 104*bb*, 106*ab*. This allows each VSG 110*ag*, 110*bg* to provide one of multiple data packet streams in parallel, which can be synchronized in time such that the two data packet streams are sent simultaneously as a true MIMO data packet. By transmitting different data packet streams from the VSGs 110*ag*, 110*bg*, testing of true MIMO receiver functionality can be achieved. Further, by appropriately programming the VSGs 110*ag*, 110*bg* to produce baseband signals representing different phases, VSG signals can be generated to emulate a true MIMO signal channel such that the MIMO signal being produced emulates the signal that a normal DUT will see, i.e., a combination of the two data packet streams arriving at different phases at the two DUT receiver ports.

Alternatively, with such extensive interconnections available via the combiners 102, signal paths 116 and signal switches 104, 106, the signals 111*ag*/111*ab*, 111*bg*/111*bb* from the VSGs 110*ag*, 110*ab* can be conveyed to the DUTs 112*a*, 112*b* in an alternating manner. For example, during a first time interval, the signal 111*ag*/111*ab* from the first VSG 110*ag* can be provided to one receiver of the first DUT 112*a* via its signal combiner 102*a*, signal path 116*a* and associated signal switches 104*aa*, 106*aa*, while the signal 111*bg*/111*bb* from the second VSG 110*bg* can be provided to the other receiver port of the first DUT 112*a* via its signal combiner 102*b*, signal path 116*j* and associated signal switches 104*bb*, 106*ab*. Following that, during a second time interval, the signal 111*ag*/111*ab* from the first VSG 110*ag* can be provided to one receiver of the second DUT 112*b* via its signal combiner 102*a*, signal path 116*d* and associated signal switches 104*ab*, 106*bb*, while the signal 111*bg*/111*bb* from the second VSG 110*bg* can be provided to the other receiver port of the second DUT 112*b* via its signal combiner 102*b*, signal path 116*h* and associated signal switches 104*ba*, 106*ba*. It will be readily appreciated, however, that this will require a longer time for testing both DUTs 112*a*, 112*b* than would be possible with substantially simultaneous conveyance of both signals 111*ag*/111*ab*, 111*bg*/111*bb* from the VSGs 110*ag*, 110*ab* to both DUTs 112*a*, 112*b*.

Figure 5:
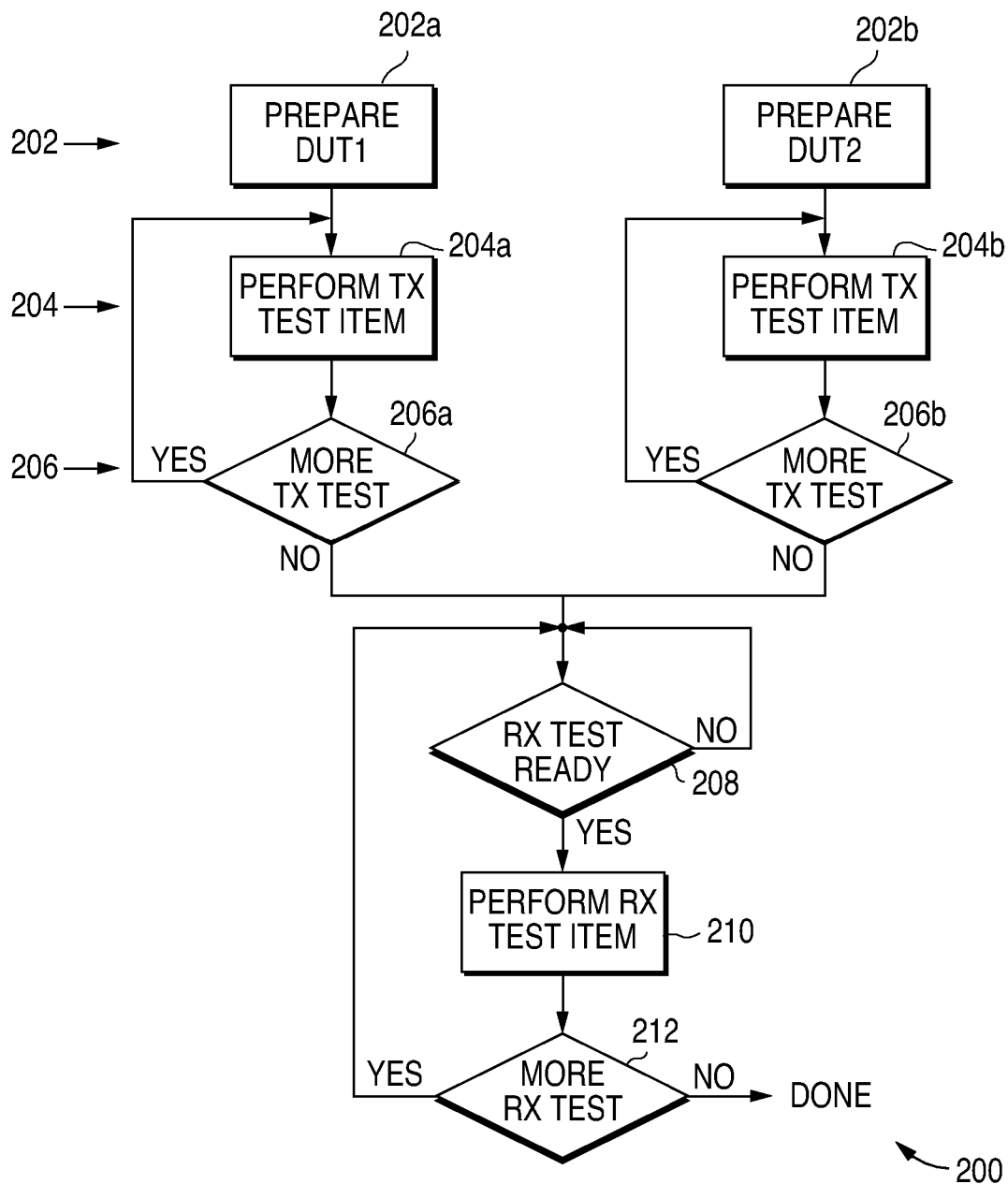
FIG. 5 is a flowchart for performing the tests using the interfaces of FIGS. 3 and 4.

Referring to FIG. 5, in accordance with another embodiment of the presently claimed invention, the test flows discussed above for FIGS. 3 and 4 can be presented as shown. In the first steps 202, the DUTs are prepared. In the next step 204, each system 110 performs the transmission test independently. These transmission tests are continued until it is determined in a decision step 206 that all tests have been completed. Following this, the system enters a wait state 208 in which all systems that have completed their respective transmission tests wait until all other systems are ready to perform a receiver test. In the next step 210, the receiver test is performed. These reception tests are continued until it is determined in a decision step 212 that all tests have been completed. In most instances, both DUTs will be tested while operating at the same frequency and using substantially similar data packet streams. Accordingly, the test times for both DUTs should be substantially similar, thereby making this a substantially parallel test operation.

Some MIMO systems include asymmetrical configurations, e.g. two transmitters and three receivers, in which case, the system as described above will support the lower number of data packet streams, with one VSG needed for each receiver. For example, if the system is asymmetrical such that it can transmit two data packet streams and receive three data packet streams, then three VSGs will be needed. Alternatively, if three receivers are operating in parallel but they can only process a maximum of two data packet streams, then only two VSGs may be needed, in which case if two data packet streams are transmitted using three VSGs it is possible that a faulty receiver could go undetected. In other words, if the system can only process two data packet streams via the three receivers, each receiver should be isolated and separately tested to ensure it is fully functional, since if the two data packet streams are supplied to the two functional receivers, the DUT can pass the test and yet not be fully functional due to the one non-functional receiver. The receivers can be tested two at a time, with any unused receiver having its input port properly terminated, although a more complex switching matrix may be needed. As another alternative, the individual receivers can be tested for RSSI (receive signal strength indication) or one receiver can receive one data packet stream while the other receivers each receive a second data packet stream. In any event, in accordance with the presently claimed invention, so long as the test interface includes signal combiners and associated signal switches equal in number to the higher of the number of transmitters and receivers, virtually any combination of testing can be performed for both symmetrical and asymmetrical MIMO systems.

Figure 6:
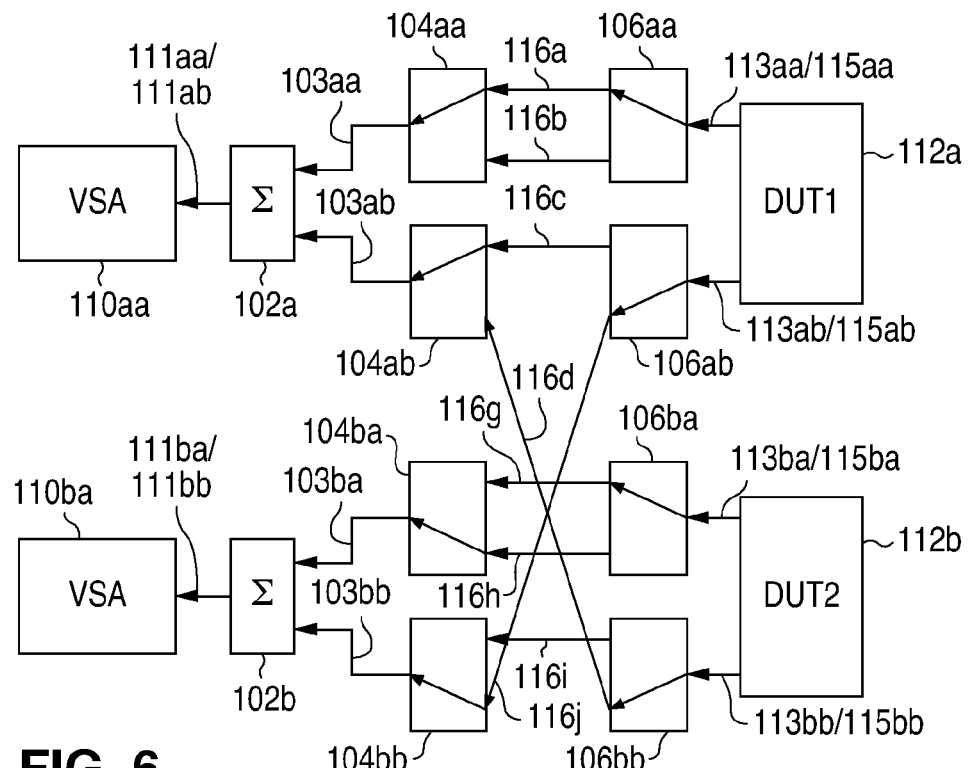
FIG. 6 is a functional block diagram of a 2×2 test interface for MIMO testing in accordance with another embodiment of the presently claimed invention.

Referring to FIG. 6, in accordance with another embodiment of the presently claimed invention, true MIMO transmission EVM testing can be performed by using all VSAs in parallel to capture the transmitted data packets from one DUT. For example, in a 2×2 system, the first VSA 110*aa* receives a signal 111*aa*/111*ab* containing the data packet stream 113*aa*/115*aa* from the first DUT 112*a* via its signal combiner 102*a*, signal path 116*a* and associated signal switches 104*aa*, 106*aa*. Simultaneously, the second VSA 110*va* receives a signal 111*ba*/111*bb* containing the same data packet stream 113*ab*/115*ab* from the first DUT 112*a* via its signal combiner 102*b*, signal path 116*j* and associated signal switches 104*bb*, 106*ab*. Following completion of testing of the first DUT 112*a*, the second DUT 112*b* can be tested by altering the signal switch connections such that the first VSA 110*aa* receives a data packet stream 113*bb*/115*bb* via its signal combiner 102*a*, signal path 116*d* and associated signal switches 104*ab*, 106*bb*, and the second VSA 110*ba* receives the same data packet stream 113*ba*/115*ba* via its signal combiner 102*b*, signal path 116*g* and associated signal switches 114*ba*, 106*ba*. This allows sequential testing of true MIMO EVM.

Figure 7:
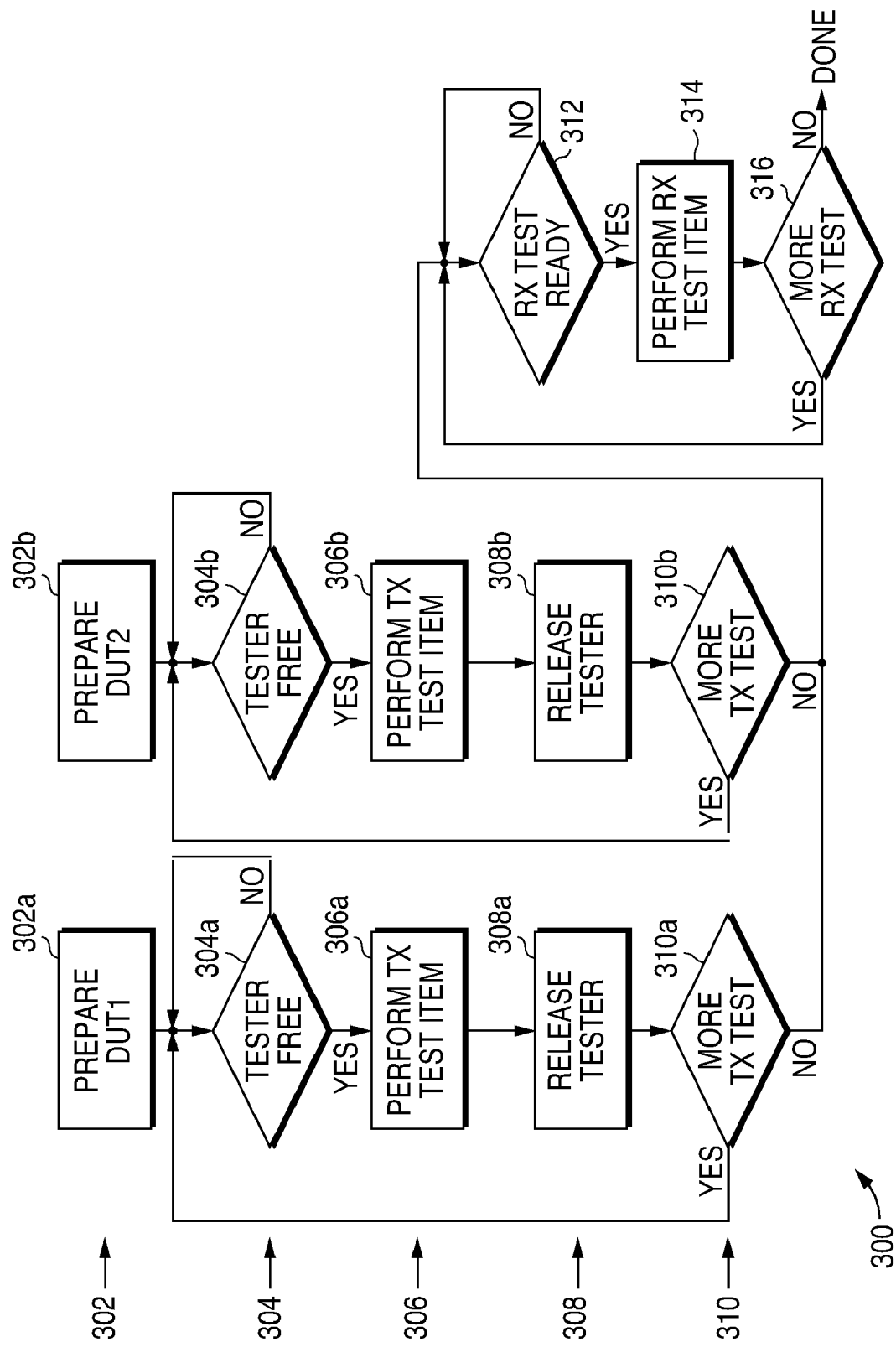
FIG. 7 is a flowchart for performing the test using the interface of FIG. 6.

Referring to FIG. 7, this test flow can be represented as shown. For transmission testing, the DUTs operate in parallel but share access to the test system. Accordingly, in the first step 302, both DUTs are prepared for testing. In the next step 304, both DUTs request access to the test system, following which one obtains access and initiates testing while the other remains in a wait state until the test system becomes available again. In the next step 306, the DUT with access performs its transmission test, following which the test system is released 308. In the next step 310, if more transmission tests are required, the DUT enters a wait state 304 pending availability of the test system. After both DUTs have completed their respective transmission tests, the system enters a wait state 312 pending readiness for receive testing. When ready, in the next step 314, receive testing is performed, with further receive testing performed if necessary 316. Alternatively, with sufficiently fast signal switches 104, 106, it is possible to wait for both systems to become ready, following which data capture begins by first capturing the data of one DUT 112a, resetting the appropriate switches, and then capturing the data of the other DUT 112b (with the recognition of valid data capture effectively serving as a handshake indicating readiness for switching to receive another DUT output).

Switched EVM testing is typically performed by capturing multiple consecutive data packets using the same test system 110, but selecting a different DUT transmitter for each data packet. Following the capturing of the data packet, the data packets are combined and analyzed. For example, in a system supporting two transmitters, two consecutive data packets are captured (one from each DUT transmitter). Similarly, in a system supporting three transmitters, three data packets will be captured. Comparing this to measuring true MIMO EVM capturing only one data packet will yield similar results. As discussed above, using switched EVM testing allows parallel testing of multiple DUTs in a system with parallel sets of VSAs and VSGs. For a system testing three 3×3 DUTs at the same time, each of the three VSAs will need to capture three data packets (one for each DUT transmitter). Since the system is capable of fast signal switching, a true transmit MIMO data capture can be performed for each DUT. If the DUTs are operated in parallel, i.e., transmitting the same data packet at the same frequency, but not necessarily synchronous in time, capturing MIMO data will take virtually the same time as performing switched EVM, and the same amount of data will be transferred.

Figure 8:
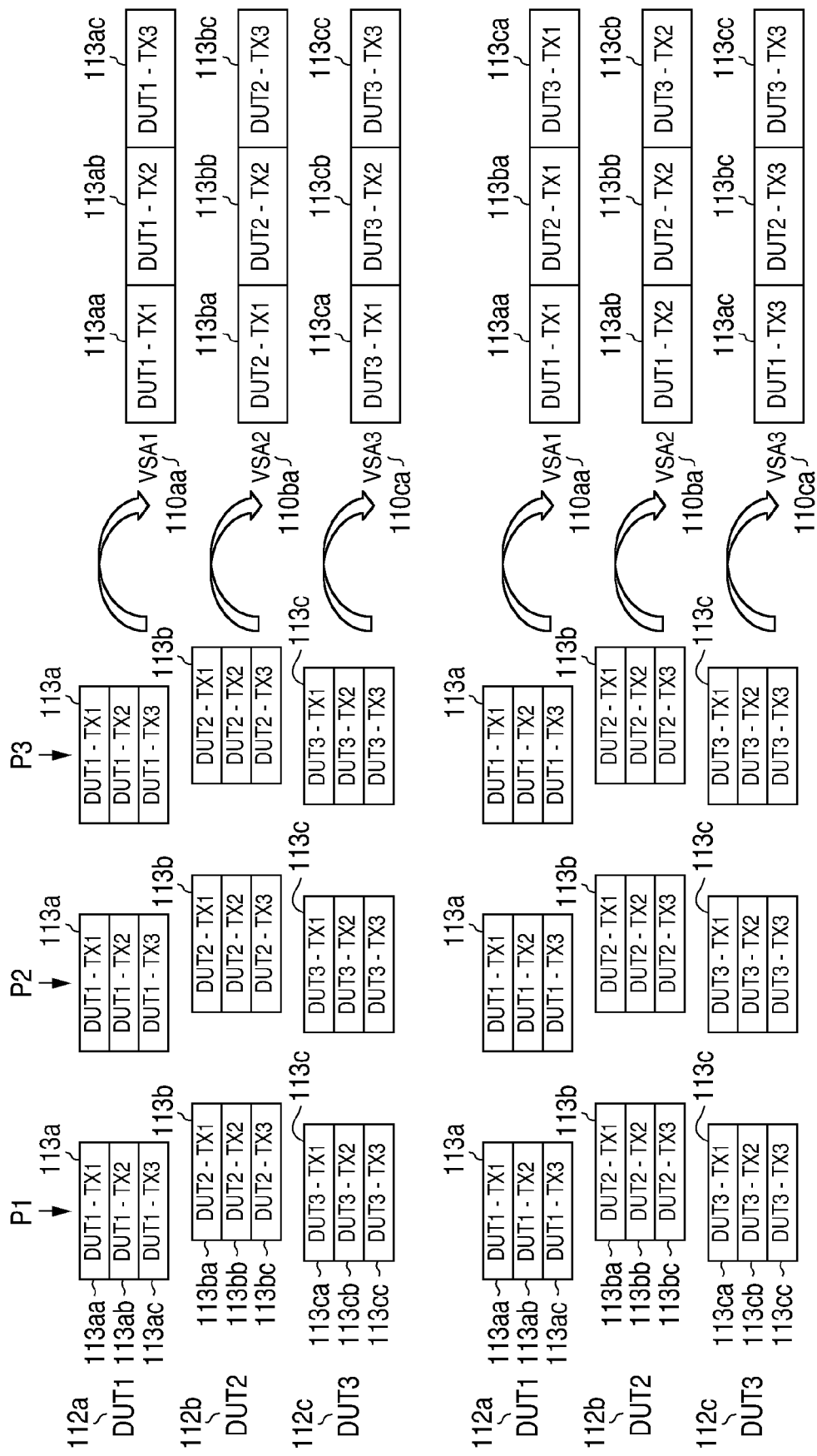
FIG. 8 is a data flow diagram illustrating switched EVM and true transmit EVM data flows in accordance with alternative embodiments of the presently claimed invention.

Referring to FIG. 8, in accordance with another embodiment of the presently claimed invention, a comparison of the switched EVM and true MIMO test techniques can be better understood. The upper portion of this figure illustrates the switched EVM testing approach, while the lower portion illustrates the true MIMO testing approach. In both examples, each DUT 112a, 112b, 112c transmits its respective data packet 113a, 113b, 113c during three data packet intervals P1, P2, P3. The first VSA 110aa captures the first transmitter output 113aa, second transmitter output 113ab and third transmitter output 113ac during data packet intervals P1, P2 and P3, respectively. This is achieved by switching the signal switches 104, 106, as discussed above, between the data packets 113a, 113b, 113c. Meanwhile, in parallel, the second VSA 110ba captures the first transmitter output 113ba, second transmitter output 113bb and third transmitter output 113bc of the second DUT 112b during data packet intervals P1, P2 and P3, respectively. Similarly, also in parallel, the third VSA 110ca captures the first 113ca, second 113cb and third 113cc transmitter outputs of the third DUT 112c during data packet intervals P1, P2 and P3, respectively. Following capturing of all these data packets, the captured data packets are transferred to the analysis software for processing.

During MIMO testing, the DUTs 112a, 112b, 112c also transmit their respective data packets 113a, 113b, 113c during the data packet intervals P1, P2, P3. With appropriate control of the signal switches 104, 106, as discussed above, the first VSA 110aa captures the first transmitter outputs 113aa, 113ba, 113ca of the three DUTs 112a, 112b, 112c during the three data packet intervals P1, P2, P3. Similarly, the second 110ba and third 110ca VSAs capture the second 113ab, 113bb, 113cb and third 113ac, 113bc, 113cc transmitter outputs, respectively, of the DUTs 112a, 112b, 112c during the data packet intervals P1, P2, P3. In other words, during the first data packet interval P1, the first VSA 110aa, second VSA 110ba and third VSA 110ca capture the first transmitter output 113aa, second transmitter output 113bb and third transmitter output 113ac, respectively, of the first DUT 112a. Similarly, during the second data packet interval P2, the first VSA 110aa, second VSA 110ba and third VSA 110ca capture the first 113ba, second 113bb and third 113bc transmitter outputs, respectively, of the second DUT 112b. Further, similarly, during the third data packet interval P3, the first VSA 110aa, second VSA 110ba and third VSA 110ca capture the first 113ca, second 113cb and third 113cc transmitter outputs, respectively, of the third DUT 112c.

The captured data packets in the three VSAs 110aa, 110ba, 110ca can then be combined such that the analysis software controlling the first DUT 112a receives the three captured data packets associated with the first DUT 112a. Similarly, the analysis software controlling the second 112b and third 112c DUTs will receive the data packets associated with the second 112b and third 112c DUTs, respectively.

Figure 9:
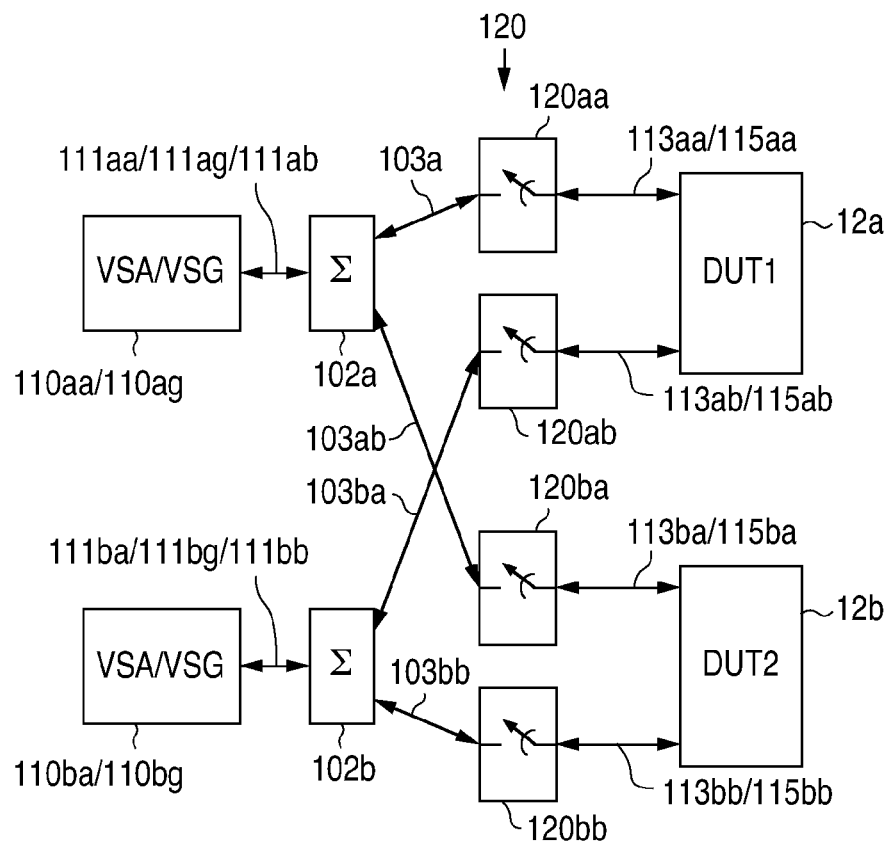
FIG. 9 is a functional block diagram of an alternative embodiment of the 2×2 test interface of FIGS. 3 and 4.

Referring to FIG. 9, in accordance with another embodiment of the presently claimed invention, if only true MIMO transmit EVM testing is desired, the configuration of signal switches can be simplified. For example, both sets 104, 106 of single pole, double throw switches can be replaced by a single set 120 of single pole, single throw switches, since it is only necessary to alternately open and close the single paths. For receiver testing, all switches 120 are closed, thereby enabling true parallel receiver testing since each DUT 12a, 12b receives a signal from each VSG 110ag, 110bg. For transmitter testing, the upper switches 120aa, 120ab are closed and the lower switches 120ba, 120bb are opened for testing the first DUT 12a, while the upper switches 120aa, 120ab are opened and the lower switches 120ba, 120bb are closed for testing the second DUT 12b. It will be readily appreciated that this configuration can be expanded in terms of the number of switches 120 and signal ports on the signal combiners 102a to support more than this 2×2 system. It will be further readily appreciated that instead of switches, the signal paths can be effectively opened and closed by using signal attenuators having programmable higher and lower signal attenuations, respectively.

Figure 10:
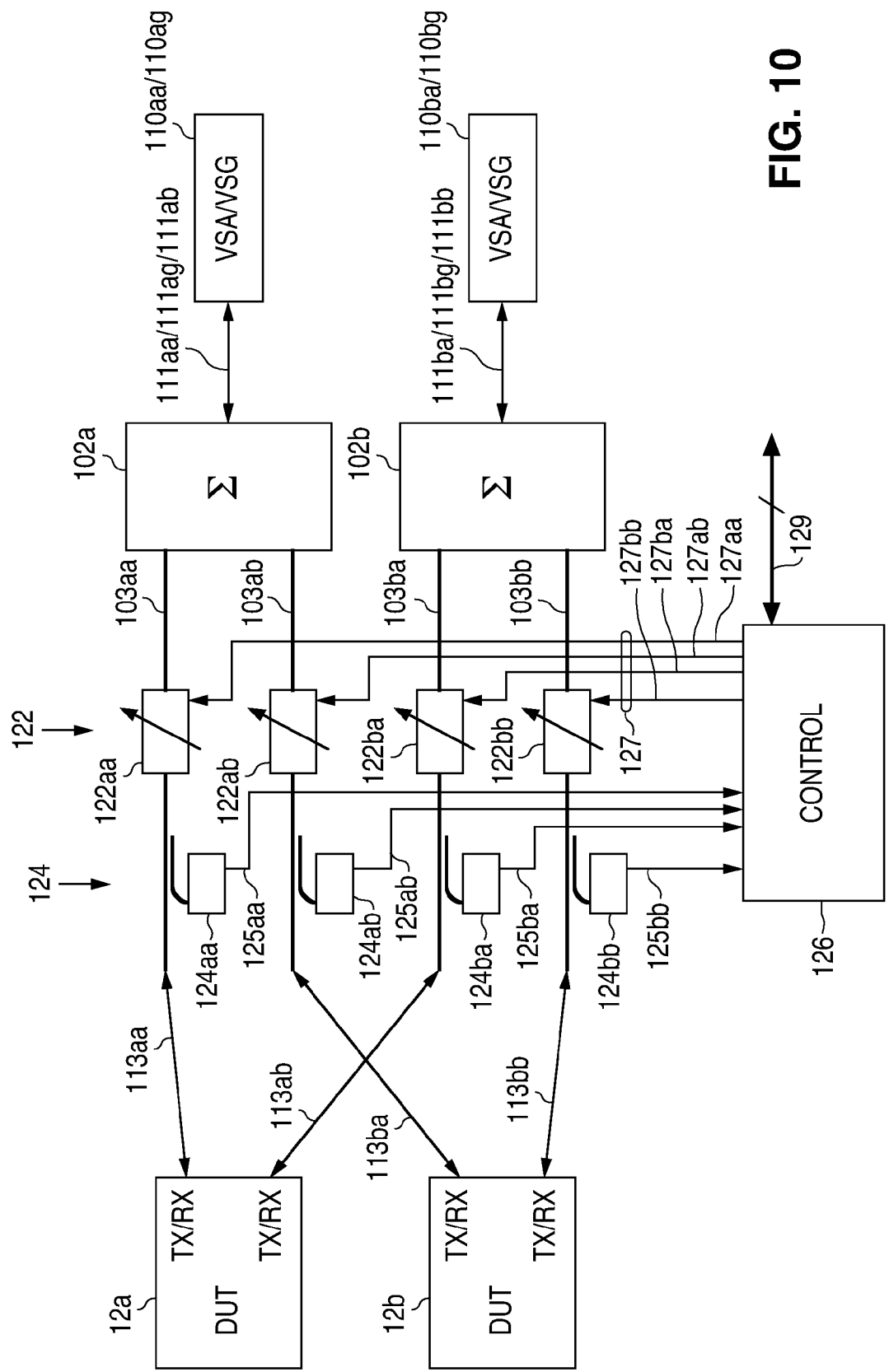
FIG. 10 is a functional block diagram of another alternative embodiment of the 2×2 test interface of FIGS. 3 and 4.

Referring to FIG. 10, in accordance with another embodiment of the presently claimed invention for a 2×2 system, control over the signal paths closest to the signal combiners 102 can be implemented using programmable signal attenuators 122 and signal detectors 124. With this implementation, some degree of automatic control can be achieved since the signal detectors 124 (e.g., power coupling circuits) can detect the presence of transmit signals from the DUTs 12a, 12b. For example, upon detection of the presence of an active transmit signal, each signal detector 124aa, 124ab, 124ba, 124bb can initiate, e.g. assert, a detection signal 125aa, 125ab, 125ba, 125bb indicating such presence of a transmit signal. A controller 126 monitoring these detection signals 125aa, 125ab, 125ba, 125bb, which can also be under the control of a computer via one or more control signals 129, provides appropriate attenuator control signals 127 for the signal attenuators 122. For example, if the first signal detector 124aa indicates the presence of a transmit signal, while the remaining signal detectors 124ab, 124ba, 124bb fail to detect any transmit signals, and it is desired that subsequent data packets received via the same path as the detected signal be conveyed to the first VSA 110aa for testing, the controller can program the first signal attenuator 122*aa* via its control signal 127*aa* for low, or minimum, signal attenuation, while programming the remaining signal attenuators 122*ab*, 122*ba*, 122*bb* via their control signals 127*ab*, 127*ba*, 127*bb* for higher, or maximum, signal attenuation.

In accordance with another embodiment of the presently claimed invention, the test interface discussed above can be used to support testing of Wi-Fi MIMO devices operating simultaneously in two frequency bands, e.g., simultaneous operation at 2.4 gigahertz (GHz) in a 2×2 MIMO configuration or higher, and at 5 GHz in a 2×2 or higher MIMO configuration. Such devices can be tested sequentially, but such testing does not ensure that the device can operate in both frequency bands simultaneously (e.g., due to effects of crosstalk or inter-channel coupling). Using a test interface in accordance with the presently claimed invention allows such devices to be tested in a pseudo-parallel manner.

Referring back to FIG. 3, the two DUTs 112*a*, 112*b* can be considered as a single DUT with the first DUT portion 112*a* being the 2.4 GHz channel and the second DUT portion 112*b* being the 5 GHz channel. In the event that the VSAs 110*aa*, 110*ba* cannot operate simultaneously at two frequencies more than 2 GHz apart, true transmit EVM testing can be performed in the 2.4 GHz frequency band, followed by similar testing in the 5 GHz frequency band. In any event, switched and composite EVM testing can be performed in parallel. Similarly, single data stream testing for the receiver can be performed. Additionally, sensitivity, i.e., not PER, can be tested using a pseudo-link test (where the DUT returns an acknowledgment signal when a good packet is received), thereby making it possible to test sensitivity for simultaneous transmit and receive operations. Of course, if the VSAs 110*a*, 110*ba* and VSGs 110*ag*, 110*bg* are capable of operating simultaneously at frequencies more than 2 GHz apart, such limitations can be avoided.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a digital communications test system for testing a plurality of devices under test (DUTs), comprising:
   a plurality of DUT electrodes to couple to a plurality of DUTs, convey a plurality of DUT transmission signals from said plurality of DUTs, and convey a plurality of DUT reception signals to said plurality of DUTs;
   a plurality of signal combining and dividing circuits to couple to a plurality of vector signal analyzers (VSAs) and a plurality of vector signal generators (VSGs), wherein each one of said plurality of signal combining and dividing circuits is adapted to combine at least first and second ones of said plurality of DUT transmission signals for a respective one of said plurality of VSAs, and divide a signal from a respective one of said plurality of VSGs to provide at least first and second ones of said plurality of DUT reception signals; and
   a plurality of signal conveyance control circuits coupled between said plurality of DUT electrodes and said plurality of signal combining and dividing circuits, and responsive to one or more conveyance control signals by conveying one or more selected ones of said plurality of DUT transmission signals from one or more of said plurality of DUT electrodes to one or more of said plurality of signal combining and dividing circuits, and
   conveying one or more of said plurality of DUT reception signals from one or more of said plurality of signal combining and dividing circuits to one or more of said plurality of DUT electrodes.

2. The apparatus of claim 1, wherein said plurality of signal conveyance control circuits is responsive to said one or more conveyance control signals by conveying one or more selected ones of said plurality of DUT transmission signals from one or more of said plurality of DUT electrodes to one or more of said plurality of signal combining and dividing circuits to facilitate one or more error vector magnitude (EVM) measurements by one or more of said plurality of VSAs for one or more of said plurality of DUTs, including one or more of composite, switched and multiple input multiple output (MIMO) EVM measurements.

3. The apparatus of claim 1, wherein said plurality of signal conveyance control circuits comprises a plurality of signal switching circuits responsive to said one or more conveyance control signals by providing one or more closed signal connections between one or more selected ones of said plurality of DUT electrodes and one or more selected ones of said plurality of signal combining and dividing circuits to convey said one or more selected ones of said plurality of DUT transmission signals and plurality of DUT reception signals.

4. The apparatus of claim 1, wherein said plurality of signal conveyance control circuits comprises a plurality of signal attenuation circuits responsive to said one or more conveyance control signals by providing a plurality of signal paths between respective ones of said plurality of DUT electrodes and respective ones of said plurality of signal combining and dividing circuits with one or more of said plurality of signal paths having respective higher signal attenuations and remaining ones of said plurality of signal paths having respective lower signal attenuations to convey said one or more selected ones of said plurality of DUT transmission signals and plurality of DUT reception signals.

5. The apparatus of claim 1, further comprising signal detection and control circuitry coupled to said plurality of DUT electrodes and said plurality of signal conveyance control circuits, and responsive to detection of one or more of said plurality of DUT transmission signals by conveying said detected one or more of said plurality of DUT transmission signals to one or more of said plurality of signal combining and dividing circuits.

6. The apparatus of claim 5, wherein said signal detection and control circuitry comprises:
   a plurality of signal detectors responsive to said detection of one or more of said plurality of DUT transmission signals by providing one or more signal detection signals; and
   control circuitry coupled to said plurality of signal detectors and responsive to said one or more signal detection signals by providing said one or more conveyance control signals.

7. The apparatus of claim 1, wherein:
   respective groups of at least first and second ones of said plurality of DUT electrodes are adapted to couple to a respective one of said plurality of DUTs, convey respective groups of at least first and second ones of said plurality of DUT transmission signals from said respective one of said plurality of DUTs, and convey respective groups of at least first and second ones of said plurality of DUT reception signals to said respective one of said plurality of DUTs; and said plurality of signal conveyance control circuits is responsive to one or more conveyance control signals by providing one or more of conveyance of at least one of said respective groups of at least first and second ones of said plurality of DUT transmission signals to one of said plurality of signal combining and dividing circuits with substantially simultaneous conveyance of said at least first and second ones of said plurality of DUT transmission signals, conveyance of at least one of said respective groups of at least first and second ones of said plurality of DUT transmission signals to one of said plurality of signal combining and dividing circuits with substantially mutually exclusive conveyance of said at least first and second ones of said plurality of DUT transmission signals, conveyance of at least one of said respective groups of at least first and second ones of said plurality of DUT transmission signals to at least first and second ones of said plurality of signal combining and dividing circuits with substantially simultaneous conveyance of each one of said at least first and second ones of said plurality of DUT transmission signals to a respective one of said at least first and second ones of said plurality of signal combining and dividing circuits, and conveyance of at least first and second ones of said plurality of DUT reception signals from respective ones of said plurality of signal combining and dividing circuits to one or more of said respective groups of at least first and second ones of said plurality of DUT electrodes with substantially simultaneous conveyance of said at least first and second ones of said plurality of DUT reception signals.

8. An apparatus including a digital communications test system for testing a plurality of devices under test (DUTs), comprising:

a plurality of DUT connector means for conveying a plurality of DUT transmission signals from a plurality of DUTs, and conveying a plurality of DUT reception signals to said plurality of DUTs;

a plurality of signal combiner and divider means each one of which is for combining at least first and second ones of said plurality of DUT transmission signals for a respective one of a plurality of vector signal analyzers (VSAs) and dividing a signal from a respective one of a plurality of vector signal generators (VSGs) to provide at least first and second ones of said plurality of DUT reception signals; and a plurality of signal conveyance control means for responding to one or more conveyance control signals by conveying one or more selected ones of said plurality of DUT transmission signals from one or more of said plurality of DUT connector means to one or more of said plurality of signal combining and dividing circuits, and conveying one or more of said plurality of DUT reception signals from one or more of said plurality of signal combining and dividing circuits to one or more of said plurality of DUT connector means.

* * * * *